(12) United States Patent
Schlotthauer et al.

(10) Patent No.: US 12,047,895 B2
(45) Date of Patent: Jul. 23, 2024

(54) METHOD FOR WIRELESSLY INTEGRATING A RADIO SUBSCRIBER INTO AN AUTOMATION SYSTEM

(71) Applicant: Beckhoff Automation GmbH, Verl (DE)

(72) Inventors: Daniel Schlotthauer, Berlin (DE); Torsten Budde, Gütersloh (DE)

(73) Assignee: Beckhoff Automation GmbH, Verl (DE)

( * ) Notice: Subject to any disclaimer, the term of this patent is extended or adjusted under 35 U.S.C. 154(b) by 408 days.

(21) Appl. No.: 17/566,857

(22) Filed: Dec. 31, 2021

(65) Prior Publication Data

US 2022/0124661 A1    Apr. 21, 2022

Related U.S. Application Data

(63) Continuation of application No. PCT/EP2020/073920, filed on Aug. 27, 2020.

(30) Foreign Application Priority Data

Aug. 30, 2019 (DE) ..................... 10 2019 123 348.8

(51) Int. Cl.
*H04W 56/00* (2009.01)
*H04B 1/713* (2011.01)
*H04W 76/15* (2018.01)

(52) U.S. Cl.
CPC ........ *H04W 56/0055* (2013.01); *H04B 1/713* (2013.01); *H04W 56/0015* (2013.01); *H04W 76/15* (2018.02)

(58) Field of Classification Search
CPC ......... H04W 56/0055; H04W 56/0015; H04W 76/15; H04B 1/713
See application file for complete search history.

(56) References Cited

U.S. PATENT DOCUMENTS 2,292,387 A    8/1942   Kiesler et al.
4,975,930 A    12/1990  Shaw
(Continued)

FOREIGN PATENT DOCUMENTS

AU    2017202093 A1 * 10/2017    ............. H04B 1/713
AU    2017202093 A1   10/2017
(Continued)

OTHER PUBLICATIONS

Office Action dated Nov. 18, 2021 in connection with Chinese patent application No. 201980076290.9, 8 pages including translation.

(Continued)

*Primary Examiner* — Saad A. Waqas
(74) *Attorney, Agent, or Firm* — Dorsey & Whitney LLP (57) ABSTRACT

An automation system has a master control unit, a first radio subscriber, a first radio device and a clock master. The first radio device has a first synchronization element, a first radio module and a first connection for the bus system. The first radio module can establish a radio connection to the first radio subscriber for data exchange with a bus system provided by the master control unit. The first radio connection has a first radio channel with a first frequency range. The first synchronization element is set up to output a synchronization signal to the first radio module, based on a signal received from the clock master via the first connection. The first radio module is set up to change a frequency of the first radio channel based on the synchronization signal, within the first frequency range, on the basis of a first hopping table.

15 Claims, 6 Drawing Sheets

(56) References Cited

U.S. PATENT DOCUMENTS

| | | | |
|---|---|---|---|
| 6,014,406 | A | 1/2000 | Shida et al. |
| 7,228,450 | B2 | 6/2007 | Fuehrer et al. |
| 7,362,834 | B2 | 4/2008 | Fuehrer et al. |
| 2002/0129291 | A1 | 9/2002 | Gonzalez |
| 2005/0107103 | A1 | 5/2005 | Melpignano |
| 2006/0077917 | A1 | 4/2006 | Brahmajosyula et al. |
| 2006/0112191 | A1 | 5/2006 | Ooi |
| 2015/0372764 | A1 | 12/2015 | Kaneda |
| 2016/0191185 | A1 | 6/2016 | Webb et al. |
| 2017/0150464 | A1* | 5/2017 | Kazehaya ............. H04L 12/422 |
| 2017/0276474 | A1* | 9/2017 | Shimada ................ G01B 11/24 |
| 2019/0013986 | A1 | 1/2019 | Shao et al. |
| 2019/0094837 | A1* | 3/2019 | Oh ....................... G05B 19/418 |
| 2020/0120033 | A1* | 4/2020 | Wolberg ........... H04W 28/0205 |
| 2021/0266084 | A1 | 8/2021 | Vonnahme |

FOREIGN PATENT DOCUMENTS

| | | | |
|---|---|---|---|
| CN | 1706144 | A | 12/2005 |
| CN | 106664093 | A | 5/2017 |
| DE | 102018129189 | A1 | 5/2020 |
| EP | 0367378 | B1 | 9/1996 |
| JP | H09284858 | A | 10/1997 |
| WO | 02075993 | A2 | 9/2002 |
| WO | 02076031 | A2 | 9/2002 |
| WO | 03071741 | A1 | 8/2003 |
| WO | 02075993 | A3 | 10/2003 |
| WO | 2013048770 | A1 | 4/2013 |
| WO | 2020104414 | A1 | 5/2020 |

OTHER PUBLICATIONS

Office Action dated Aug. 12, 2022 in connection with Chinese patent application No. 202080057714.X, 9 pages including English translation.

"IO-Link Wireless System Extensions: Specification" IO-Link Community, Karlsruhe, Germany, Version 1.1, Mar. 2018, 302 pages.

Office Action dated Apr. 30, 2020 in connection with German patent application No. DE 10 2019 123 348.8, 19 pages including English translation.

Preview of International Standard "Programmable Controllers" IEC 61131-9, Edition 1.0, Sep. 2013, 39 pages.

International Search Report and Written Opinion dated Nov. 6, 2020 in connection with International Patent Application No. PCT/EP2020/073920, 21 pages including English translation.

Intention to Grant dated Nov. 24, 2021 in connection with European Patent Application No. 19806191.3, 12 pages including English translation.

International Preliminary Report on Patentability dated Nov. 24, 2021 in connection with International Patent Application No. PCT/EP2020/073920, 24 pages including English translation.

International Search Report and Written Opinion dated Feb. 7, 2020 in connection with International Patent Application No. PCT/EP2019/081727, 18 pages including English translation.

Ryan, Colin , et al., Ryan, Colin et al. "Clock synchronisation on multiple TTCAN network channels," Microprocessors and Microsystems 28, 2004, pp. 135-146.

"EtherCAT—the Ethernet Fieldbus," EtherCAT Technology Group, Nov. 2012, 21 pages.

* cited by examiner

| t | K1 |
|---|---|
| 1 | 17 |
| 2 | 12 |
| 3 | 49 |
| 4 | 6 |
| 5 | 13 |
| 6 | 37 |
| ... | ... |

H1

| t | K2 |
|---|---|
| 1 | 12 |
| 2 | 59 |
| 3 | 7 |
| 4 | 13 |
| 5 | 8 |
| 6 | 21 |
| ... | ... |

H2

| t | K3 |
|---|---|
| 1 | 36 |
| 2 | 42 |
| 3 | 23 |
| 4 | 19 |
| 5 | 59 |
| 6 | 6 |
| ... | ... |

METHOD FOR WIRELESSLY INTEGRATING A RADIO SUBSCRIBER INTO AN AUTOMATION SYSTEM

CROSS-REFERENCE TO RELATED APPLICATIONS

This patent application is a continuation of International Patent Application PCT/EP2020/073920, filed 27 Aug. 2020, entitled AUTOMATION SYSTEM, RADIO APPARATUS AND METHOD FOR WIRELESSLY INTEGRATING A RADIO CLIENT IN AN AUTOMATION SYSTEM, which claims the priority of German patent application DE 10 2019 123 348.8, filed 30 Aug. 2019, entitled AUTOMATISIERUNGSSYSTEM, FUNKVORRICHTUNG UND VERFAHREN ZUM DRAHTLOSEN EINBINDEN EINES FUNKTEILNEHMERS AN EIN AUTOMATISIERUNGSSYSTEM, each of which is incorporated by reference herein, in the entirety and for all purposes.

FIELD

The present invention relates to an automation system, a radio device, and a method for incorporating a radio subscriber into an automation system.

BACKGROUND

Automation systems are known in which a master control unit provides a communication bus by which bus subscribers may be addressed and/or data from a bus node may be received. Communication can take place via data telegrams that are received and sent by the bus subscribers, e.g. via the IO link communication system standardized in the international standard IEC 61131-9. Furthermore, systems are known in which a bus subscriber provides a wireless communication path to radio subscribers. Communication options provided by a wireless communication path to radio subscribers are e.g. referred to as IO link wireless.

Thereby, radio devices may be used which are e.g. referred to as IO link wireless masters. Such an IO link wireless master may have up to five radio modules, wherein each of the radio modules may send and receive data on its associated radio channel, wherein the radio channels may also be referred to as tracks. Up to eight radio subscribers may be integrated via each radio channel. Frequency spreading may be provided to change the channel of the radio channels in order to avoid any collisions and/or to reduce the effects of such collisions. For this to take place, the channel change must be carried out in a synchronized manner for all radio channels. This may be done via a hardwired synchronization line within the IO link wireless master. An example of such frequency spreading is the procedure known as "Frequency Hopping Spread Spectrum," which may also be abbreviated to "Frequency Hopping."

SUMMARY

The present invention provides a more flexible automation system and a more flexible radio device for such an automation system as well as a method for operating such an automation system.

According to a first aspect, an automation system has at least one master control unit, at least one first radio subscriber, a first radio device, and a clock master. The clock master is set up to output signals. A bus system is provided by the master control unit, wherein communication within the automation system takes place via the bus system. The first radio device comprises a first synchronization element, a first radio module, and a first connector for the bus system. The first radio module is set up to establish a first radio connection to the first radio subscriber and thereby exchange data between the first radio subscriber and the bus system.

The first radio connection has a first radio channel, the first radio channel comprising a first frequency range. The first radio module has a first synchronization input. The first synchronization element is configured to output a first synchronization signal to the first synchronization input of the first radio module based on a signal received for the bus system from the clock master via the first connection. The first radio module is arranged to be able to change a frequency within the first frequency range of the first radio channel on the basis of the first synchronization signal, the change of frequency being carried out on the basis of a first hopping table.

The first radio device is operated in such a way that a change of frequency is triggered by the first synchronization signal, wherein the clock master outputs a signal which is received by the synchronization element and from which the first synchronization signal is generated. This allows for a more flexible automation system in which further radio devices can be used elsewhere that are also synchronized. For example, if eight or fewer radio devices are to be used, the radio device may be less complex in design than the known IO link wireless masters with a hardwired synchronization line.

The first radio device can be set up in such a way that the first radio connection to the first radio subscriber complies with the IO link wireless standard.

According to a second aspect, a radio device for wireless integration of a radio subscriber into an automation system has a synchronization element, a radio module and a connection for a bus system. The radio module is configured to establish a wireless connection to the radio subscriber and comprises a synchronization input. The wireless (radio) connection comprises a radio channel, the radio channel comprising a frequency range. The synchronization element is configured to output a synchronization signal to the synchronization input of the radio module on the basis of a signal received for the bus system from a clock master via the radio connection. The radio module is set up to change a frequency within the frequency range of the radio channel on the basis of the synchronization signal, the change of frequency being performed on the basis of a hopping table.

According to a third aspect, a method for wireless integration of at least one radio subscriber into an automation system is disclosed. In this method, a radio connection to the radio subscriber is at first established by a radio module. Subsequently, a signal is received from a clock master of a bus system. A synchronization signal is then output to a synchronization input of the radio module on the basis of the signal output by the clock master. The synchronization signal is then used to change a frequency within a frequency range of a radio channel, with the frequency being changed using a hopping table.

EXAMPLES

In an embodiment, the first radio module is set up to comprise up to eight first radio subscribers.

In an embodiment, the automation system comprises a second radio device and a second radio subscriber. The second radio device comprises a second synchronization element, a second radio module and a second connection for the bus system. The second radio module is configured to establish a second radio connection to the second radio subscriber, thereby exchanging data between the second radio subscriber and the bus system. The second radio connection comprises a second radio channel, wherein the second radio channel comprises a second frequency range.

The second radio module comprises a second synchronization input. The second synchronization element is set up to output a second synchronization signal to the second synchronization input of the second radio module based on a signal for the bus system received from the clock master via the second connection.

The second radio module is configured to change a frequency within the second frequency range of the second radio channel on the basis of the second synchronization signal, the change of frequency being performed on the basis of a second hopping table. In this context, it may be provided that the first frequency range and the second frequency range overlap or coincide. The first hopping table and the second hopping table can then be embodied in such a way that a different frequency is used within the first radio channel than within the second radio channel.

In another embodiment, the frequency of the first radio channel and the frequency of the second radio channel are changed simultaneously. This minimizes collisions during data transmission in the first radio channel and in the second radio channel. It may be provided in this context that the first radio device and the second radio device are arranged in such a way that radio ranges of the first radio device and the second radio device overlap, respectively.

In an embodiment, the automation system has a third radio device and a third radio subscriber. The third radio device comprises a third synchronization element, a third radio module and a third connection for the bus system. The third radio module is set up to establish a third radio connection to the third radio subscriber and thereby exchange data between the third radio subscriber and the bus system. In this context, the third radio connection comprises a third radio channel, wherein the third radio channel comprises a third frequency range.

The third radio module has a third synchronization input. The third synchronization element is configured to output a third synchronization signal to the third synchronization input of the third radio module on the basis of a signal received for the bus system from the clock master via the third connection. The third radio module is configured to change a frequency of the third frequency range of the third radio channel on the basis of the third synchronization signal, the change of frequency being performed on the basis of a third hopping table.

In an embodiment, the second radio device is arranged within a first radio range of the first radio device and of a third radio range of the third radio device, and the first radio device is arranged outside of the third radio range of the third radio device. This allows for a flexible arrangement of the components of the automation system.

In another embodiment, the third radio channel with the third hopping table is identical to the first radio channel with the first hopping table. As a result, the first radio channel may advantageously be used for the first radio connection and the third radio connection respectively, since the first radio connection and the third radio connection do not interfere with each other due to the radio range. Changing the frequency of the first radio connection, second radio connection and third radio connection may again be performed simultaneously. The first radio connection and the third radio connection therefore take place within the first radio channel.

It may be provided to integrate further radio devices and radio subscribers in the automation system. In particular, up to five different radio channels can be provided, which are made available via spatially distributed radio devices. Each of the five radio channels has a hopping table assigned.

In an embodiment, a change of a frequency of the radio channels occurs after a predetermined time interval, in particular in a time interval between one hundred microseconds and ten milliseconds. For example, the frequency of the radio channels can be changed every 1.664 milliseconds.

In another embodiment, at least one of the synchronization elements comprises a synchronized clock. The associated synchronization signal is output based on a time of the synchronized clock, wherein a time of the synchronized clock can be set based on the signal output by the clock master. In this context, the synchronized clock or the synchronized clocks can be embodied as so-called distributed clocks, as described in German patent application DE 10 2018 129 189.2 dated 20 Nov. 2018. The content of the German patent application DE 10 2018 129 189.2 is expressly incorporated by reference into the present patent application with respect to this aspect, and for all other purposes. In this context, the synchronization elements can comprise the components referred to as internal clocks in German patent application DE 10 2018 129 189.2, and the clock master can comprise the elements referred to as reference clocks in German patent application DE 10 2018 129 189.2.

In an embodiment, the signal output by the clock master comprises a clock time.

The first frequency range and/or the second frequency range and/or the third frequency range of the described embodiments may overlap. This means that transmission and reception may take place in identical frequency ranges within the radio channels. The hopping tables of the radio channels can then be configured in such a way that a frequency is used in each radio channel that is not simultaneously used within the other radio channels. In particular, a selection of the radio frequency to be used can be carried out according to the fact that the radio connections of the radio channels do not interfere with one another.

In an embodiment of the radio device, the changing of the frequency within the frequency range of the radio channel can take place after a predetermined time interval, in particular in a time interval between one hundred microseconds and ten milliseconds. This may provide a radio device that responds quickly to interference. If the radio channel is disturbed within the predetermined time interval, at least not too many data packets are affected since the frequency of the radio channel is changed quickly.

In another embodiment of the radio device, the synchronization element comprises a synchronized clock. The synchronization signal is output based on a time of the synchronized clock, wherein the time of the synchronized clock is set based on the signal received from the clock master. In an embodiment of the radio device, the synchronization signal is output at predetermined times. In this case, it may be provided that the predetermined times are stored in a control program of the radio device. In another embodiment, the radio device is set up to receive information about the predetermined times by data transmission via the bus system. These two embodiments allow for efficient activation of the synchronization element with a clock master assigned to the automation system.

In an embodiment of the radio device, the radio module is set up to comprise up to eight radio subscribers.

BRIEF DESCRIPTION OF THE DRAWINGS

The invention will be discussed in more detail below with references to exemplary embodiments and the accompanying figures. Here, in a schematic illustration in each case.

DETAILED DESCRIPTION

Figure 1:
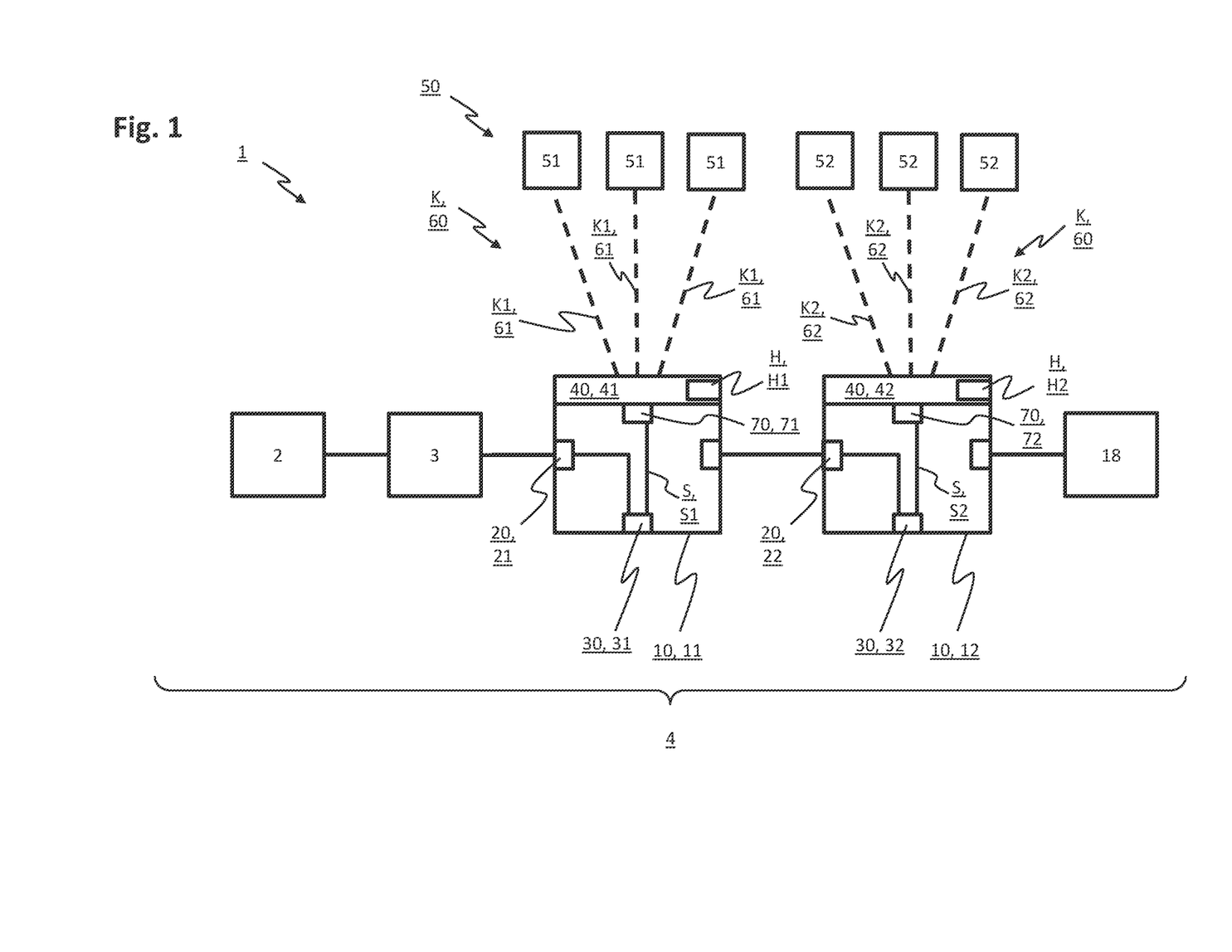
FIG. 1 shows an automation system.

FIG. 1 shows, in a possible embodiment according to the invention, an automation system 1 with a master control unit 2, a clock master 3, two radio devices 10 having a first radio device 11 and a second radio device 12, six radio subscribers 50 each with three first radio subscribers 51 and three second radio subscribers 52. A bus system 4 is provided by the master control unit 2, the clock master 3, the first radio device 11 and the second radio device 12 being subscribers of the bus system 4. Communication within the automation system 1 takes place via the bus system 4.

The first radio device 11 is used to integrate the three first radio subscribers 51 into the automation system 1. It may e.g. be provided that the first radio subscribers 51 comprise sensors and/or actuators, wherein sensor data of the sensors are to be read into the bus system 4 or commands are to be transmitted from the bus system 4 to the actuators and this can take place via the first radio device 11.

The first radio device 11 has a synchronization element 30, which is referred to as a first synchronization element 31 due to its arrangement in the first radio device 11, a radio module 40, which is referred to as a first radio module 41 due to its arrangement in the first radio device 11, and a connection 20, which is referred to as a first connection 21 for the bus system 4 due to its arrangement in the first radio device 11. The first radio module 41 may establish radio connections 60, in the case shown first radio connections 61 to the first radio subscribers 51, the first radio connections 61 being indicated as dashed lines in the depiction of FIG. 1.

Data may be exchanged between the first radio subscribers 51 and the bus system 4 via the first radio connections 61, this data exchange being enabled by the first radio device 11. The first radio connection 61 comprises a radio channel K embodied as a first radio channel K1. The first radio channel K1 thereby comprises a frequency range in which a frequency may be selected. As a synchronization input 70, the first radio module 41 comprises a first synchronization input 71.

The first synchronization element 31 is configured to output a synchronization signal S, in particular a first synchronization signal S1, to the first synchronization input 71 of the first radio module 41 on the basis of a signal received for the bus system 4 from the clock master 3 via the first connection 21. The first radio module 41 is set up to change a frequency within the frequency range of the first radio channel K1 on the basis of the first synchronization signal S1, the change of frequency being performed on the basis of a hopping table H, in particular a first hopping table H1. The first hopping table H1 may specify which frequency is to be changed to next.

The number of first radio subscribers 51 is not limited to three; more or fewer first radio subscribers 51 may be provided, as well, e.g. up to eight first radio subscribers 51. If the first radio connections 61 comply with the IO link wireless standard, up to eight parallel first radio connections 61 are possible.

Also shown in FIG. 1 is an optional second radio device 12 and three optional second radio subscribers 52. The second radio device 12 is used to integrate the three second radio subscribers 52 into the automation system 1. It may e.g. be provided that the second radio subscribers 52 comprise sensors and/or actuators, wherein sensor data from the sensors are to be read into the bus system 4 or commands are to be transmitted from the bus system 4 to the actuators and this may be done by the second radio device 12.

The second radio device 12 has a synchronization element 30, which is referred to as a second synchronization element 32 due to its arrangement in the second radio device 12, a radio module 40, which is referred to as a second radio module 42 due to its arrangement in the second radio device 12, and a connection 20, which is referred to as a second connection 22 for the bus system 4 due to its arrangement in the second radio device 12. The second radio module 42 may also establish radio connections 60, in the case shown second radio connections 62, to the second radio subscribers 52, the second radio connections 62 also being indicated as dashed lines in the depiction of FIG. 1.

Via the second radio connections 62, data may be exchanged between the second radio subscribers 52 and the bus system 4, this data exchange being enabled by the second radio device 12. The second radio connection 62 comprises a radio channel K formed as a second radio channel K2. The second radio channel K2 thereby comprises a frequency range in which a frequency may be selected.

As a synchronization input 70, the second radio module 42 comprises a second synchronization input 72. The second synchronization element 32 is configured to output a synchronization signal S, in particular a second synchronization signal S2, to the second synchronization input 72 of the second radio module 42 on the basis of a signal received for the bus system 4 from the clock master 3 via the second connection 22. The second radio module 42 is set up to change a frequency within the frequency range of the second radio channel K2 on the basis of the second synchronization signal S2, the change of frequency being performed on the basis of a hopping table H, in particular a second hopping table H2. The second hopping table H2 may specify the frequency to be changed to next.

The number of second radio subscribers 52 is not limited to three; more or fewer second radio subscribers may be provided, e.g. up to eight second radio subscribers 52. If the second radio connections 62 comply with the IO link wireless standard, up to eight parallel second radio connections 62 are possible.

Also shown in FIG. 1 is an optional further bus subscriber 18, which may also be a sensor and/or actuator and is integrated directly into the bus system 4, i.e. without a radio connection 60.

In an embodiment, the frequency of the first radio channel K1 and the second radio channel K2 is changed simultaneously. This enables the first radio channel K1 and the second radio channel K2 not to interfere with each other. For this purpose, the first hopping table H1 and the second hopping table H2 may be selected accordingly.

Figure 2:
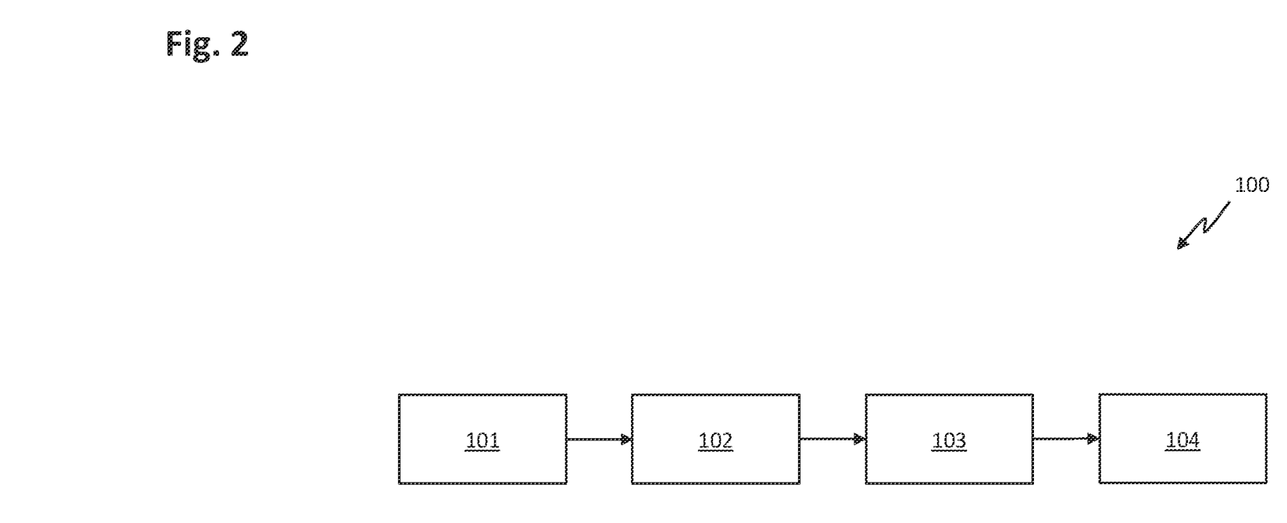
FIG. 2 shows a flow chart of a method for wireless integration of a radio subscriber into an automation system.

FIG. 2 shows a flow chart 100 of a method for wirelessly integrating of a radio subscriber 50 into an automation system 1. In a setup step 101, a radio connection 60 is first established to the radio subscriber 50 by a radio module 40. Subsequently, in a receiving step 102, a signal is received from a clock master 3 of a bus system 4. Then, in an output step 103, a synchronization signal S is output to a synchronization input 70 of the radio module 40, the synchronization signal S being output based on the signal output by the clock master 3. Then, based on the synchronization signal S, a frequency of a frequency range of a radio channel K is changed in a changing step 104, wherein the changing of the frequency is performed based on a hopping table H.

The radio subscriber 50 may correspond to the first radio subscriber 51 and/or the second radio subscriber 52 of FIG. 1. The radio connection 60 may correspond to the first radio connection 61 and/or the second radio connection 62 of FIG. 1. The radio module 40 may correspond to the first radio module 41 and/or the second radio module 42 of FIG. 1. The bus system 4 may correspond to the bus system 4 of FIG. 1. The synchronization signal S may correspond to the first synchronization signal S1 and/or the second synchronization signal S2 of FIG. 1. The synchronization input 70 may correspond to the first synchronization input 71 and/or the second synchronization input 72 of FIG. 1. The radio channel K may correspond to the first radio channel K1 and/or the second radio channel K2 of FIG. 1. The hopping table H may correspond to the first hopping table H1 and/or the second hopping table H2 of FIG. 1.

It may be provided that the radio subscriber 50 receives the hopping table H in an initialization phase prior to execution of the method and then expects a first transmission from the radio device 10 on a radio channel K. Subsequently, the radio subscriber 50 may also change the frequency of the radio channel K on the basis of the hopping table H.

Figure 3:
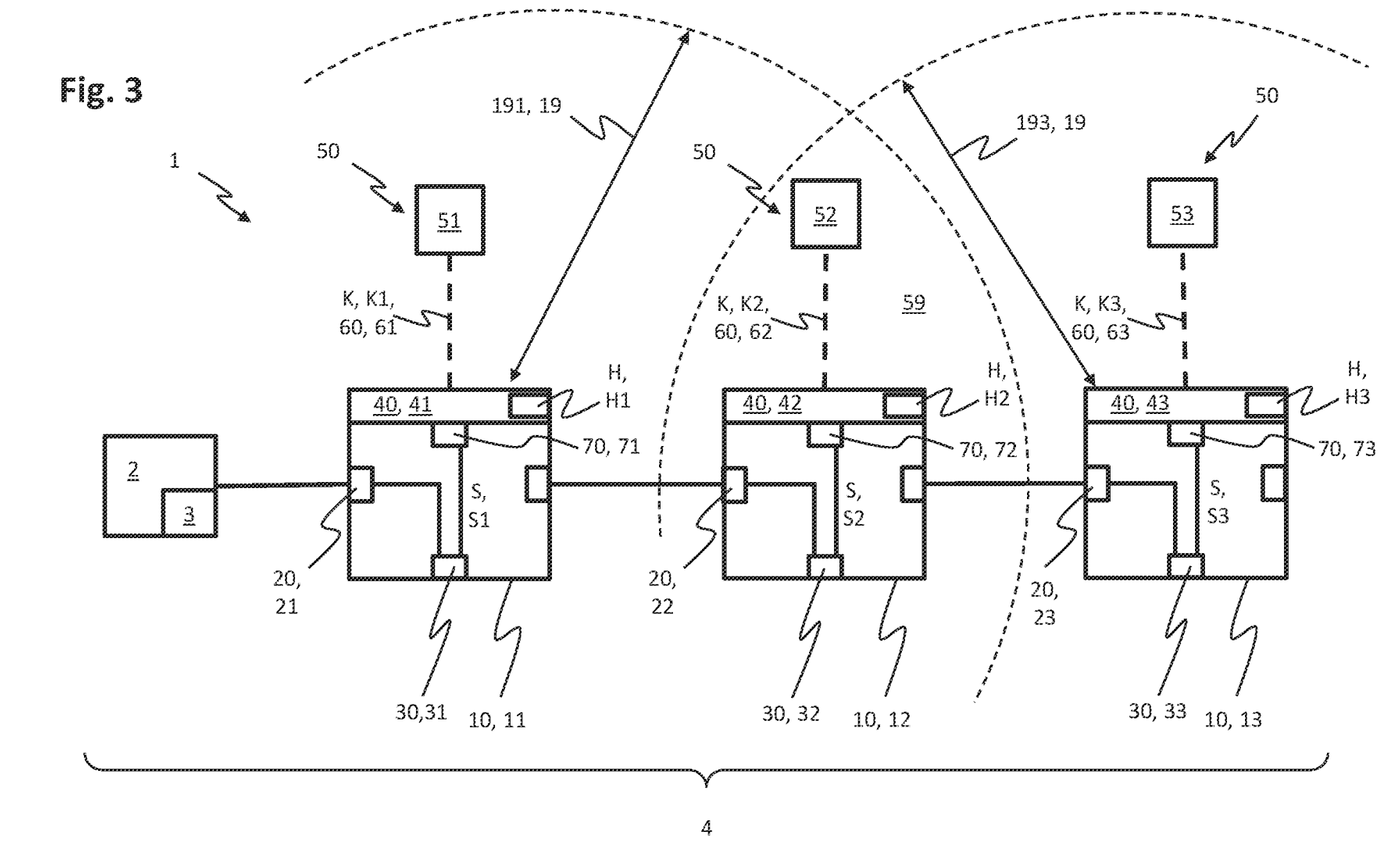
FIG. 3 shows a further automation system.

FIG. 3 shows an automation system 1 that corresponds to the automation system 1 of FIG. 1, unless differences are described in the following. The further bus subscriber 18 of FIG. 1 is not included in the automation system 1 of FIG. 3. The clock master 3 is integrated in the master control unit 2. This may also be the case analogously for FIG. 1; alternatively, the master control unit 2 and the clock master 3 in the automation system 1 of FIG. 3 may also be embodied separately from each other analogously to FIG. 1. In each case, only a first radio subscriber 51 and a second radio subscriber 52 are provided.

In addition, the automation system 1 comprises a third radio device 13 and a third radio subscriber 53. The third radio device 13 is embodied substantially analogously to the first radio device 11 or second radio device 12 described in connection with FIG. 1. The third radio subscriber 53 is formed substantially analogously to the first radio subscriber 51 or second radio subscriber 52 described in connection with FIG. 1.

The third radio device 13 is used to integrate the third radio subscriber 53 into the automation system 1. It may e.g. be provided that the third radio subscriber 53 comprises sensors and/or actuators, wherein sensor data from the sensors are to be read into the bus system 4 or commands are to be transmitted from the bus system 4 to the actuators and this may be done by the third radio device 13.

The third radio device 13 comprises a third synchronization element 33, a third radio module 43 and a third connection 23 for the bus system 4. The third radio module 43 may establish third radio connections 63 to the third radio subscriber 53, the third radio connection 63 being indicated as a dashed line in the illustration of FIG. 3. The third radio connection 63 may be used to exchange data between the third radio subscriber 53 and the bus system 4, wherein this data exchange is enabled by the third radio device 13. The third radio connection 63 thereby comprises the third radio channel K3. In this context, the third radio channel K3 comprises a frequency range in which a frequency may be selected.

The third radio module 43 comprises a third synchronization input 73. The third synchronization element 33 is set up to output a third synchronization signal S3 to the third synchronization input 73 of the third radio module 43 on the basis of a signal received for the bus system 4 from the clock master 3 via the third connection 23. The third radio module 43 is configured to change a frequency within the frequency range of the third radio channel K3 on the basis of the third synchronization signal S3, the change of frequency being performed on the basis of a third hopping table H3.

More than a third wireless subscriber 53 may be provided, e.g. up to eight third wireless subscribers 53. If the third wireless connection 63 complies with the IO link wireless standard, up to eight parallel third wireless connections 63 are possible.

In the embodiment example shown in FIG. 3, the second radio device 12 is arranged within a radio range 19 of the first radio device 11, i.e., a first radio range 191, and a radio range 19 of the third radio device 13, i.e., a third radio range 193. The first radio device 11 is arranged outside the third radio range 193 of the third radio device 13. Then, the third radio channel K3 with the third hopping table H3 may be identical to the first radio channel K1 with the first hopping table H1. This allows for using the same first radio channel K1 and the same first hopping table H1 for the first radio device 11 and the third radio device 13, since by arranging the first radio device 11 outside of the third radio range 193 of the third radio device 13, the first radio device 11 and the third radio device 13 do not interfere with each other.

It may be provided that neither first radio subscribers 51 nor third radio subscribers 53 are arranged in an area 59, the area 59 being arranged within the first radio range 191 of the first radio device 11 and the third radio range 193 of the third radio device 13. Thus, the second radio device 12 may be arranged in the area 59 and may be used to integrate second radio subscribers 52 in the area 59. This is particularly useful if the third radio channel K3 with the third hopping table H3 is identical to the first radio channel K1 with the first hopping table H1.

Figure 4:
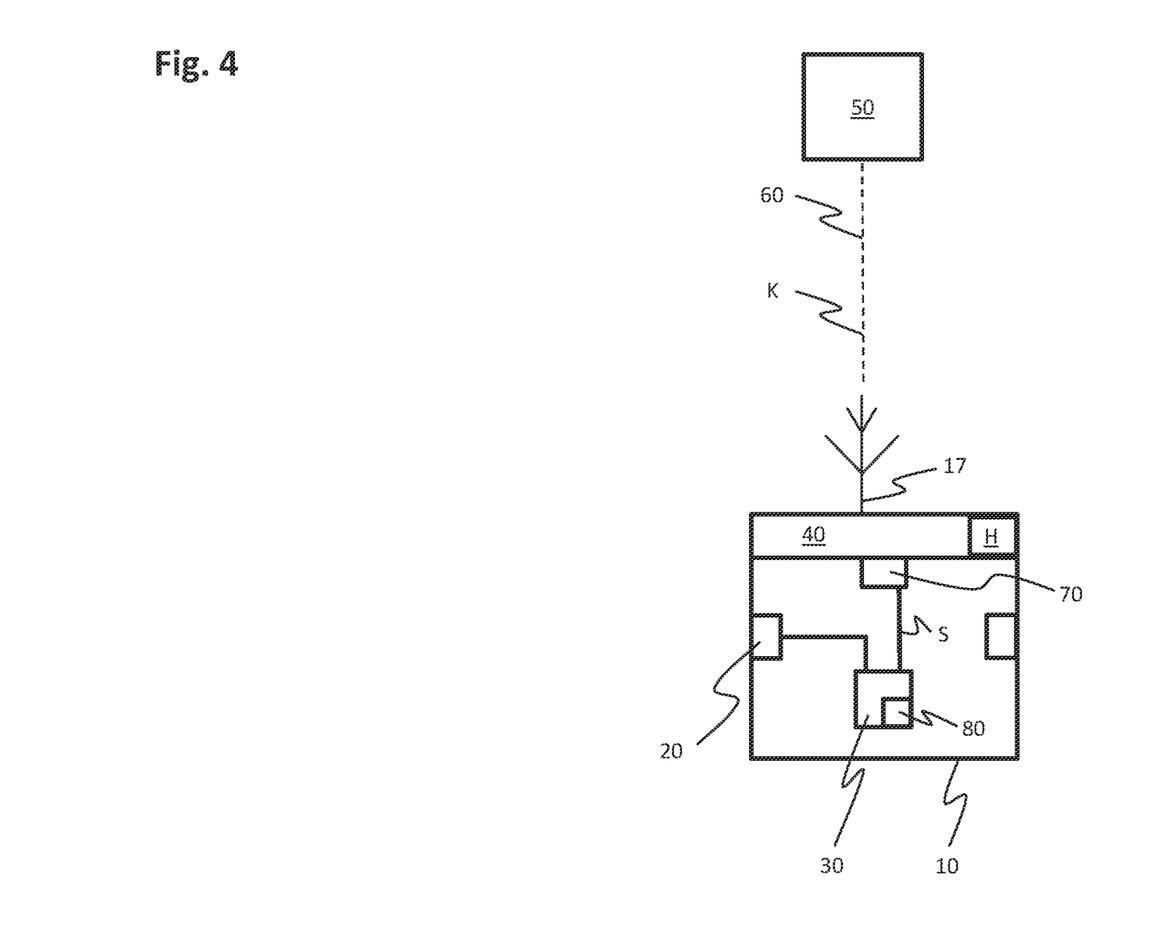
FIG. 4 shows a radio device.

FIG. 4 shows a radio device 10 for wirelessly integrating a radio subscriber 50 into an automation system 1, the radio device 10 comprising a connection 20 for a bus system 4, a synchronization element 30 and a radio module 40, the radio module 40 being configured to establish a wireless connection 60 to the radio subscriber 50, the radio module 40 comprising a synchronization input 70, the synchronization element 30 being configured to output a synchronization signal S to the synchronization input 70 of the radio module 40 on the basis of a signal received for the bus system 4 from the clock master 3 via the connection 20, the radio module 40 being configured to change the frequency of a radio channel K on the basis of the synchronization signal S, the changing of the frequency of the radio channel K being carried out on the basis of a hopping table H.

The radio device 10 comprises an antenna 17. The radio device 10 may correspond to the first radio devices 11, second radio devices 12 or third radio devices 13 already shown, which may also be equipped with the antenna 17.

In one embodiment, the synchronization element 30 comprises a synchronized clock 80. The synchronization signal S is output based on a clock time of the synchronized clock 80, wherein the time of the synchronized clock 80 is set based on the signal output from the clock master 3. This may be done at predetermined times, and the predetermined times may be part of the signal output from the clock master 3. Alternatively, the predetermined times may be stored in a control program of the radio device 10. Similarly, the first radio devices 11, second radio devices 12 and/or third radio devices 13 shown in FIGS. 1 to 3 may also include a corresponding synchronized clock 80.

Figure 5:
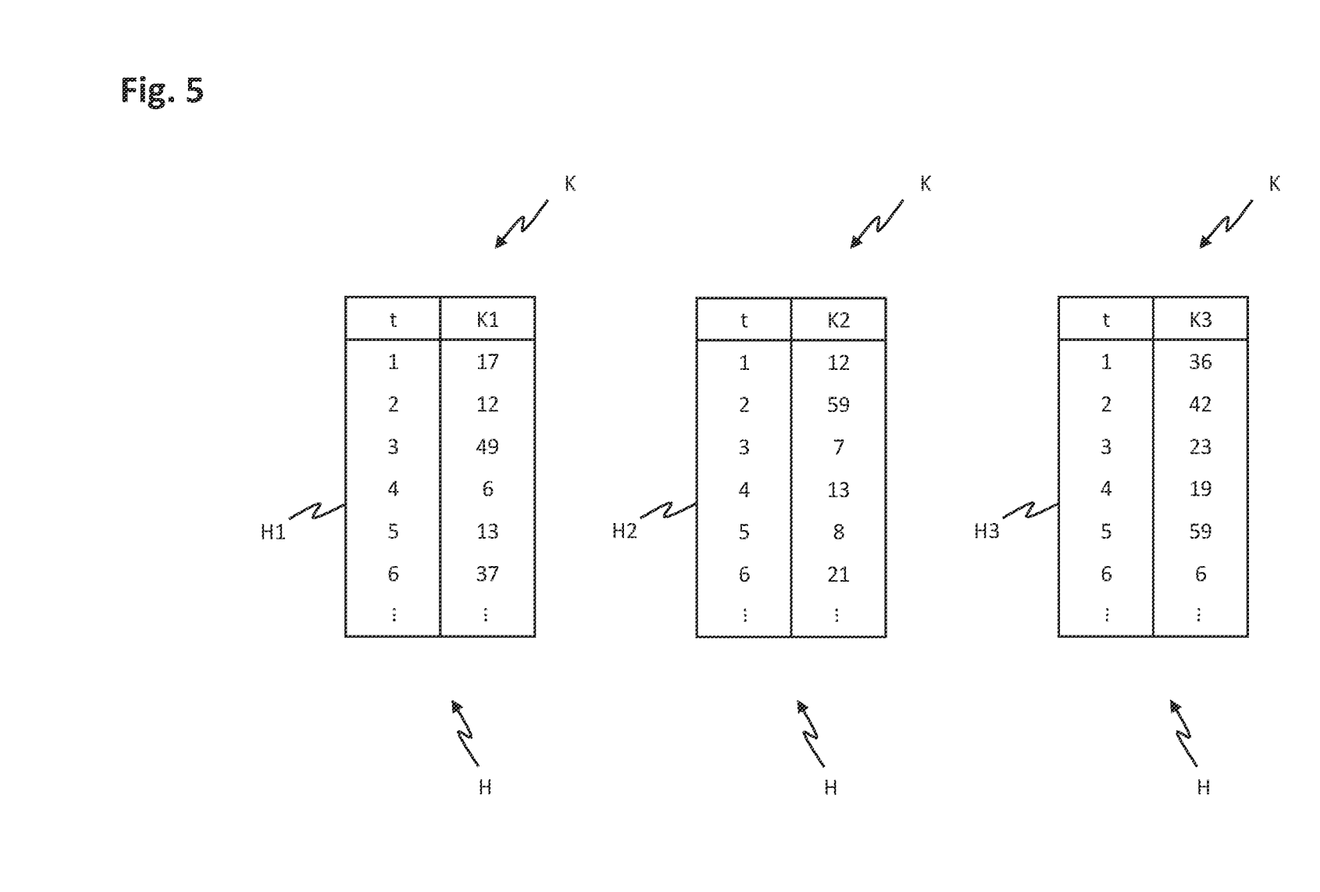
FIG. 5 shows hopping tables.

FIG. 5 shows hopping tables H that may be used to change a frequency of a radio channel K. The hopping tables include a first hopping table H1 for the first radio channel K1, a second hopping table H2 for the second radio channel K2, and a third hopping table H3 for a third radio channel K3. The first hopping table H1, the second hopping table H2, and the third hopping table H3 may be used as already described for FIGS. 1 to 3. If the first wireless device 11 and the third wireless device 13 are arranged as shown in FIG. 3 so that both may use the same wireless channel K, the third wireless channel K3 with the third hopping table H3 may match the first wireless channel K1 with the first hopping table H1. In the IO link wireless method, up to five different hopping tables H may be used for five radio channels K.

In an embodiment, a change of frequency of one of the radio channels K occurs after a predetermined time interval t, in particular in a time interval t between one hundred microseconds and ten milliseconds. In particular, the change may occur every 1.664 milliseconds. The changing of the frequency of the radio channels K may include a selection of a transmitting and receiving frequency. In this context, it may be provided on the one hand that the time of the change of the frequency is determined by the signal output by the clock master 3, either via a command to output a synchronization signal S or in that the signal output by the clock master 3 includes the predetermined time intervals t and in addition the synchronized clocks 80 of the radio subscribers 10 are synchronized on the basis of the signal. Furthermore, fixed predetermined time intervals t or points in time may be stored in the control program of the radio device 10.

Figure 6:
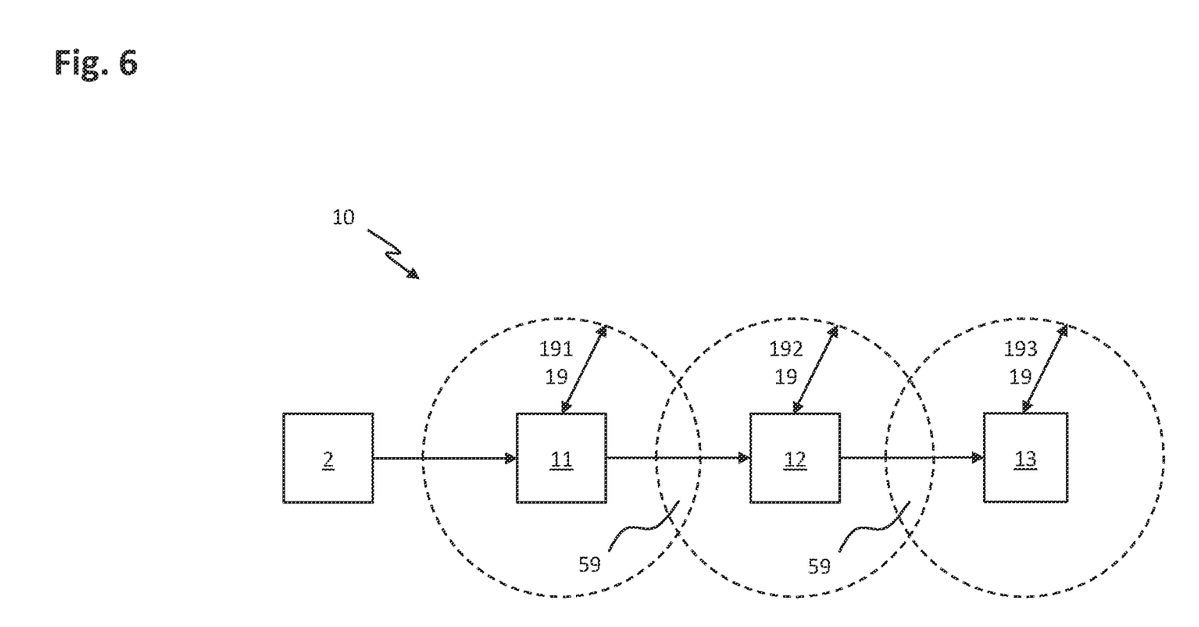
FIG. 6 shows a further automation system.

FIG. 6 shows an automation system 1 that corresponds to the automation system 1 of FIG. 3, unless differences are described in the following. For clarity reasons, connections 20, synchronization elements 30, radio modules 40 and synchronization inputs 70 of the first radio device 11, second radio device 12 and third radio device 13 have not been shown; they may be embodied as shown in FIG. 3.

The first radio device 11 is arranged outside of the second radio range 192 of the second radio device 12 or outside of the third radio range 193 of the third radio device 13. The second radio device 12 is arranged outside of the first radio range 191 of the first radio device 11 or outside of the third radio range 193 of the third radio device 13. The third radio device 13 is arranged outside of the first radio range 191 of the first radio device 11 or outside of the second radio range 192 of the second radio device 12, respectively.

However, areas 59 are within the radio range 19 of two adjacent radio devices 10, one of the areas 59 within the first radio range 191 of the first radio device 11 and within the second radio range 192 of the second radio device 12, and one of the areas 59 within the second radio range 192 of the second radio device 12 and within the third radio range 193 of the third radio device 13. Therefore, the second hopping table H2 of the second radio device 12 must in any case be different from the hopping tables H of the first radio device 11 and the third radio device 13, wherein the first radio device 11 and the third radio device 13 may use an identical hopping table H (e.g. the first hopping table H1) or may likewise use different hopping tables H.

TABLE 1

List of reference symbols

| | |
|---|---|
| 1 | automation system |
| 2 | master control unit |
| 3 | clock master |
| 4 | bus system |
| 10 | radio device |
| 11 | first radio device |
| 12 | second radio device |
| 13 | third radio device |
| 17 | antenna |
| 18 | further bus subscriber |
| 19 | radio range |
| 20 | connection |
| 21 | first connection |
| 22 | second port |
| 23 | third connection |
| 30 | synchronization element |
| 31 | first synchronization element |
| 32 | second synchronization element |
| 33 | third synchronization element |
| 40 | radio module |
| 41 | first radio module |
| 42 | second radio module |
| 43 | third radio module |
| 50 | radio subscribers |
| 51 | first radio subscriber |
| 52 | second radio subscriber |
| 53 | third radio subscriber |
| 59 | area |
| 60 | radio connection |
| 61 | first radio connection |
| 62 | second radio connection |
| 63 | third radio connection |
| 70 | synchronization input |
| 71 | first synchronization input |
| 72 | second synchronization input |
| 73 | third synchronization input |
| 80 | synchronized clock |
| 100 | flow chart |
| 101 | set-up step |
| 102 | receiving step |
| 103 | output step |
| 104 | change step |
| 191 | first radio range |
| 192 | second radio range |
| 193 | third radio range |
| H | hopping table |
| H1 | first hopping table |
| H2 | second hopping table |
| H3 | third hopping table |
| K | radio channel |
| K1 | first radio channel |
| K2 | second radio channel |
| K3 | third radio channel |
| t | time interval |
| S | synchronization signal |
| S1 | first synchronization signal |
| S2 | second synchronization signal |
| S3 | third synchronization signal |

The invention claimed is:

1. An automation system comprising:
   a master control unit,
   a first radio subscriber, a second radio subscriber and a third radio subscriber,
   a first radio device, a second radio device and a third radio device, and
   a clock master configured to output signals;
   wherein a bus system is provided by the master control unit,
   wherein communication within the automation system takes place via the bus system,
   wherein the first radio device comprises a first synchronization element, a first radio module and a first connection for the bus system, and wherein the first radio module is configured to establish a first radio connection to the first radio subscriber for data exchange between the first radio subscriber and the bus system, the first radio connection having a first radio channel, the first radio channel comprising a first frequency range, the first radio module comprising a first synchronization input, the first synchronization element being configured to output a first synchronization signal to the first synchronization input of the first radio module based on a signal received for the bus system from the clock master via the first connection, the first radio module being configured to change a frequency within the first frequency range of the first radio channel based on the first synchronization signal, the changing of the frequency within the first frequency range being carried out based on a first hopping table;

wherein the second radio device comprises a second synchronization element, a second radio module and a second connection for the bus system, wherein the second radio module is configured to establish a second radio connection to the second radio subscriber for data exchanged between the second radio subscriber and the bus system, and wherein the second radio connection has a second radio channel, wherein the second radio channel comprises a second frequency range, the second radio module having a second synchronization input, the second synchronization element being configured to output a second synchronization signal to the second synchronization input of the second radio module based on a signal received for the bus system from the clock master via the second connection, and the second radio module being configured to change a frequency within the second frequency range of the second radio channel based on the second synchronization signal, the changing of the frequency within the second frequency range being carried out based on a second hopping table;

wherein the third radio device comprises a third synchronization element, a third radio module and a third connection for the bus system, wherein the third radio module is configured to establish a third radio connection to the third radio subscriber for data exchange between the third radio subscriber and the bus system, and wherein the third radio connection comprises a third radio channel, wherein the third radio channel comprises a third frequency range, the third radio module having a third synchronization input, the third synchronization element being configured to output a third synchronization signal to the third synchronization input of the third radio module based on a signal received for the bus system from the clock master via the third connection, and the third radio module being configured to change a frequency within the third frequency range of the third radio channel based on the third synchronization signal, the changing of the frequency within the third frequency range being carried out based on a third hopping table;

wherein the second radio device is arranged within a first radio range of the first radio device and a third radio range of the third radio device, and wherein the first radio device is arranged outside the third radio range of the third radio device, and wherein the third radio channel with the third hopping table is identical to the first radio channel with the first hopping table.

2. The automation system according to claim 1, wherein the first radio module is configured to integrate up to eight first radio subscribers.

3. The automation system according to claim 1, wherein the changing of the frequency of the first radio channel and the frequency of the second radio channel is performed simultaneously.

4. The automation system according to claim 1, wherein a change of frequency of the radio channels takes place after a predetermined time interval.

5. The automation system according to claim 4, wherein the time interval is in between one hundred microseconds and ten milliseconds.

6. The automation system according to claim 1, wherein one of the synchronization elements includes a synchronized clock and wherein the associated synchronization signal is output based on a time of the synchronized clock, wherein a time of the synchronized clock is set based on the signal output from the clock master.

7. The automation system according to claim 6, wherein the signal output by the clock master comprises a time.

8. A radio device for wireless integration of at least one radio subscriber into an automation system, the radio device comprising:

a first radio subscriber, a second radio subscriber and a third radio subscriber, wherein the first radio device further comprises a first synchronization element, a first radio module and a first connection for the bus system; and wherein the first radio module is configured to establish a first radio connection to a first radio subscriber for data exchange between the first radio subscriber and a bus system, the first radio connection having a first radio channel, the first radio channel comprising a first frequency range, the first radio module comprising a first synchronization input, the first synchronization element being configured to output a first synchronization signal to the first synchronization input of the first radio module based on a signal received for the bus system from a clock master via the first connection, and the first radio module being configured to change a frequency within the first frequency range of the first radio channel based on the first synchronization signal, the changing of the frequency within the first frequency range being carried out based on a first hopping table;

wherein the second radio device comprises a second synchronization element, a second radio module and a second connection for the bus system, wherein the second radio module is configured to establish a second radio connection to a second radio subscriber for data exchanged between the second radio subscriber and the bus system, and wherein the second radio connection has a second radio channel, wherein the second radio channel comprises a second frequency range, the second radio module having a second synchronization input, the second synchronization element being configured to output a second synchronization signal to the second synchronization input of the second radio module based on a signal received for the bus system from the clock master via the second connection, and the second radio module being configured to change a frequency within the second frequency range of the second radio channel based on the second synchronization signal, the changing of the frequency within the second frequency range being carried out based on a second hopping table;

wherein the third radio device comprises a third synchronization element, a third radio module and a third connection for the bus system, wherein the third radio module is configured to establish a third radio connection to a third radio subscriber for data exchange between the third radio subscriber and the bus system, and wherein the third radio connection comprises a third radio channel, wherein the third radio channel comprises a third frequency range, the third radio module having a third synchronization input, the third synchronization element being configured to output a third synchronization signal to the third synchronization input of the third radio module based on a signal received for the bus system from the clock master via the third connection, and the third radio module being configured to change a frequency within the third frequency range of the third radio channel based on the third synchronization signal, the changing of the frequency within the third frequency range being carried out based on a third hopping table;

wherein the second radio device is arranged within a first radio range of the first radio device and a third radio range of the third radio device, and wherein the first radio device is arranged outside the third radio range of the third radio device, and wherein the third radio channel with the third hopping table is identical to the first radio channel with the first hopping table.

9. The radio device according to claim 8, wherein the changing of the frequency within the frequency range of the radio channel takes place according to a predetermined time interval.

10. The radio device according to claim 9, wherein the time interval is in between one hundred microseconds and ten milliseconds.

11. The radio device according to claim 8, wherein the synchronization element includes a synchronized clock and wherein the synchronization signal is output based on a time of the synchronized clock, wherein the time of the synchronized clock is set based on the signal received from the clock master.

12. The radio device according to claim 11, wherein the synchronization signal is output at predetermined times.

13. The radio device according to claim 12, wherein the radio device is configured to receive information about the predetermined times by a data transmission via the bus system.

14. The radio device according to claim 8, wherein the radio module is configured to integrate up to eight radio subscribers.

15. A method for wirelessly integrating a first radio subscriber, a second radio subscriber and a third radio subscriber into an automation system, having the following steps:

establishing a first radio connection to the first radio subscriber by a first radio module in a setup step;

establishing a second radio connection to the second radio subscriber by a second radio module in the setup step;

establishing a third radio connection to the third radio subscriber by a third radio module in the setup step;

receiving a signal from a clock master of a bus system in a receiving step;

outputting a first synchronization signal to a first synchronization input of the first radio module in an output step, wherein the first synchronization signal is output based on the signal output by the clock master;

outputting a second synchronization signal to a second synchronization input of the second radio module in the output step, wherein the second synchronization signal is output based on the signal output by the clock master;

outputting a third synchronization signal to a third synchronization input of the third radio module in the output step, wherein the third synchronization signal is output based on the signal output by the clock master;

changing a frequency within a frequency range of a first radio channel based on the first synchronization signal in a changing step, the changing of the frequency being performed based on a first hopping table;

changing a frequency within a frequency range of a second radio channel based on the second synchronization signal in the changing step, the changing of the frequency being performed based on a second hopping table; and changing a frequency within a frequency range of a third radio channel based on the third synchronization signal in the changing step, the changing of the frequency being performed based on a third hopping table;

wherein the second radio module is arranged within a first radio range of the first radio module and a third radio range of the third radio module, and wherein the first radio module is arranged outside the third radio range of the third radio module, and wherein the third radio channel with the third hopping table is identical to the first radio channel with the first hopping table.

* * * * *